United States Patent
Chikada et al.

(10) Patent No.: US 9,357,112 B2
(45) Date of Patent: May 31, 2016

(54) IMAGING DEVICE

(71) Applicant: Panasonic Intellectual Property Management Co., Ltd., Osaka (JP)

(72) Inventors: Noburo Chikada, Osaka (JP); Kiyotaka Nakase, Osaka (JP); Makoto Iyoda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/594,888

(22) Filed: Jan. 12, 2015

(65) Prior Publication Data

US 2015/0124161 A1 May 7, 2015

Related U.S. Application Data

(63) Continuation of application No. PCT/JP2014/001083, filed on Feb. 28, 2014.

(30) Foreign Application Priority Data

Mar. 5, 2013 (JP) .................................. 2013-042565

(51) Int. Cl.
*H04N 5/225* (2006.01)
*G03B 17/02* (2006.01)

(52) U.S. Cl.
CPC .............. *H04N 5/2252* (2013.01); *G03B 17/02* (2013.01); *H04N 5/2253* (2013.01)

(58) Field of Classification Search
CPC .... H04N 5/2252; H04N 5/2253; H04N 5/222
See application file for complete search history.

(56) References Cited

U.S. PATENT DOCUMENTS

| 6,734,914 | B1 * | 5/2004 | Nishimura | .......... H04N 5/2251 348/207.99 |
| 6,892,030 | B2 | 5/2005 | Rife | |
| 7,180,546 | B2 | 2/2007 | Kobayashi | |
| 7,197,240 | B2 | 3/2007 | Uemura et al. | |
| 7,519,291 | B2 | 4/2009 | Tokiwa et al. | |

(Continued)

FOREIGN PATENT DOCUMENTS

| JP | 2004-104168 A | 4/2004 |
| JP | 2004-325987 A | 11/2004 |

(Continued)

OTHER PUBLICATIONS

International Search Report issued in PCT/JP2014/001083, dated Apr. 1, 2014, with English translation.

*Primary Examiner* — Tuan Ho

(74) *Attorney, Agent, or Firm* — McDermott Will & Emery LLP

(57) ABSTRACT

An imaging device according to the present disclosure includes: an imaging unit that is housed in an outer case and captures an image of an object; a circuit board that is disposed on a back side in the outer case and includes a semiconductor device mounted thereon for processing a signal from the imaging unit; and a metal plate that is disposed between the imaging unit and the circuit board in the outer case and is fixed to the outer case. The metal plate has a first portion opposite to the circuit board and brought into mechanical contact with the semiconductor device through a contact member, and at least two second portions formed integrally with the first portion and bent in an optical axis direction of the imaging unit.

6 Claims, 4 Drawing Sheets

(56) References Cited

U.S. PATENT DOCUMENTS

| | | |
|---|---|---|
| 7,578,627 B2 | 8/2009 | Izumi et al. |
| 8,095,001 B2 | 1/2012 | Sasaki |
| 8,106,953 B2 | 1/2012 | Karaki |
| 8,131,141 B2 | 3/2012 | Takei et al. |
| 8,162,549 B2 | 4/2012 | Lee et al. |
| 8,207,489 B2 | 6/2012 | Aiba |
| 2004/0041937 A1 | 3/2004 | Oshima |
| 2004/0214482 A1 | 10/2004 | Ariga |
| 2006/0078326 A1 | 4/2006 | Ariga |
| 2009/0237537 A1 | 9/2009 | Maruyama et al. |
| 2011/0019079 A1 | 1/2011 | Saiki |
| 2014/0009607 A1* | 1/2014 | Chen .................. H04N 5/2253 348/143 |
| 2015/0181090 A1* | 6/2015 | Park .................. H04N 5/2254 348/374 |

FOREIGN PATENT DOCUMENTS

| | | |
|---|---|---|
| JP | 2008-227615 A | 9/2008 |
| JP | 2008-268653 A | 11/2008 |
| JP | 2008-306303 A | 12/2008 |
| JP | 2009-182922 A | 8/2009 |
| JP | 2009-229582 A | 10/2009 |
| JP | 2010-035013 A | 2/2010 |
| JP | 2010-049175 A | 3/2010 |
| JP | 2010-271418 A | 12/2010 |
| JP | 2011-040861 A | 2/2011 |
| JP | 2011-048352 A | 3/2011 |
| JP | 2011-087073 A | 4/2011 |

* cited by examiner

IMAGING DEVICE

RELATED APPLICATIONS

This application is a continuation of International Application No. PCT/JP2014/001083, filed on Feb. 28, 2014, which in turn claims the benefit of Japanese Application No. 2013-042565, filed on Mar. 5, 2013, the disclosures of which Applications are incorporated by reference herein.

BACKGROUND

1. Field

The present disclosure relates to an imaging device such as a digital camera.

2. Description of the Related Art

In an imaging device such as a digital camera with an interchangeable lens, a position of a center of gravity of the digital camera when the lens has been mounted is likely to shift to the lens side due to an increase in lens weight and miniaturization of the imaging device. As such, if the digital camera is dropped, the digital camera is at high risk of falling on its front where the lens is attached. If the camera is dropped on the front, a semiconductor on a circuit board may be damaged, particularly due to strong vibration of the circuit board in the digital camera.

In order to solve such a problem, a structure is contemplated that increases rigidity of an entire imaging device by providing an additional support member therein (for example, see Unexamined Japanese Patent Publication No. 2008-227615).

SUMMARY

An imaging device of the present disclosure includes: an imaging unit that is housed in an outer case and captures an image of an object; a circuit board that is disposed on a back side in the outer case and includes a semiconductor device mounted thereon for processing a signal from the imaging unit; and a metal plate that is disposed between the imaging unit and the circuit board in the outer case and is fixed to the outer case. The metal plate has a first portion opposite to the circuit board and brought into mechanical contact with the semiconductor device through a contact member, and at least two second portions formed integrally with the first portion and bent in an optical axis direction of the imaging unit.

DETAILED DESCRIPTION

An imaging device according to an embodiment of the present disclosure will now be described with reference to an example of a digital camera with an interchangeable lens and the accompanying drawings. Unnecessary detail, however, may be omitted. For example, detailed description of a well-known matter and a repeated description of substantially the same configuration may be omitted. This is to avoid unnecessary redundancy in the following description and to facilitate understanding by those skilled in the art.

The inventor(s) provides the accompanying drawings and the description below to enable those skilled in the art to have a thorough understanding of the present disclosure, and these are not intended to limit the subject matter defined by the claims.

Figure 1:
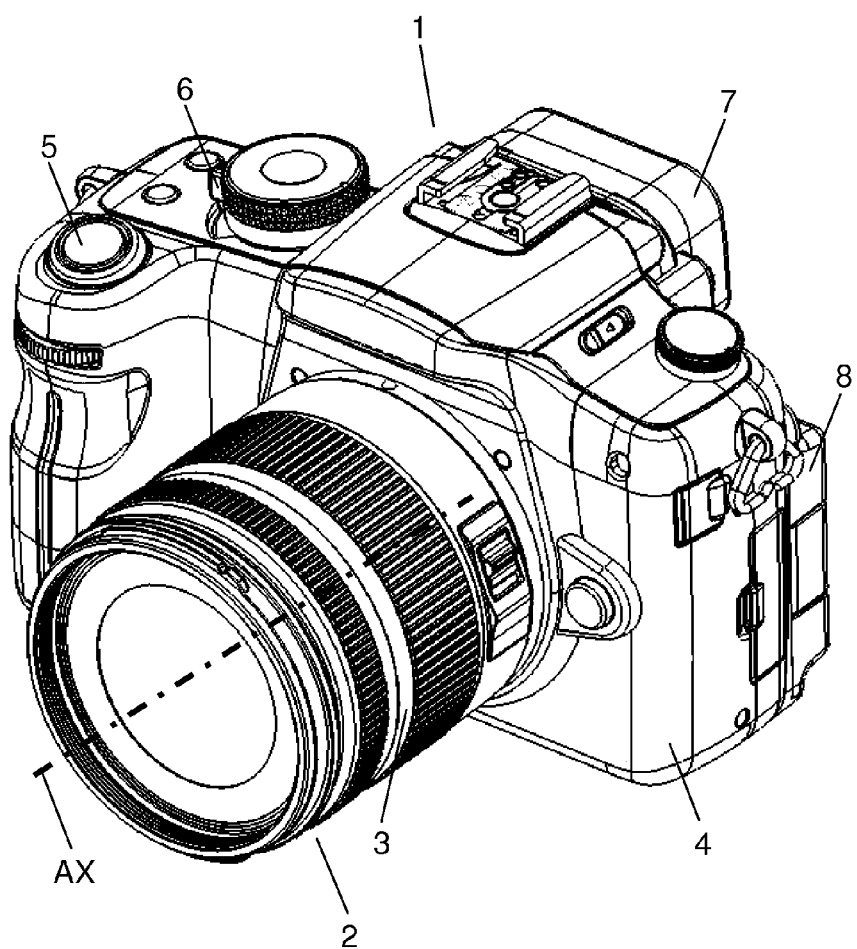
FIG. 1 is a perspective view showing an appearance of a digital camera with an interchangeable lens according to an embodiment of the present disclosure.
Figure 2:
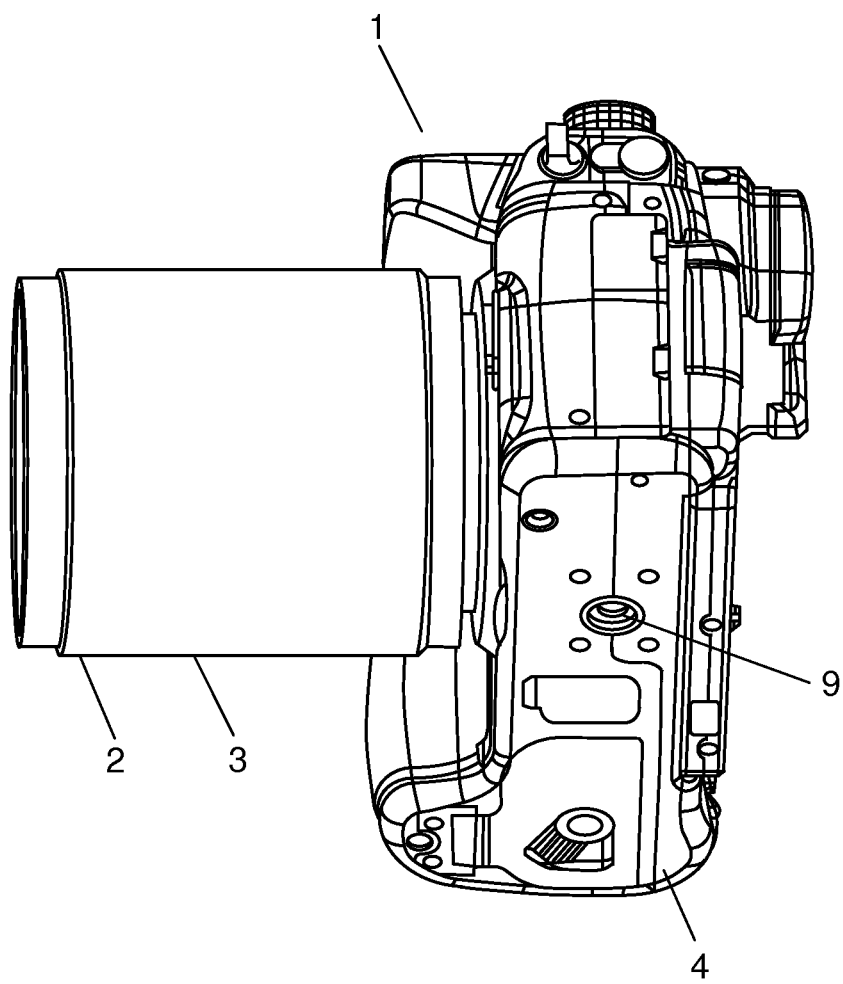
FIG. 2 is a perspective view from the bottom side of the digital camera shown in FIG. 1.

FIG. 1 is a perspective view showing an appearance of a digital camera with an interchangeable lens according to an embodiment of the present disclosure. FIG. 2 is a perspective view from the bottom side of the digital camera shown in FIG. 1.

As shown in FIG. 1, the digital camera includes camera body 1 and lens unit 2 that is removably mounted on a front side of camera body 1 and provides an optical system for forming an object image on an imaging element.

Lens unit 2 has optical system components such as a focus lens, a zoom lens, and a diaphragm, and lens unit 2 is configured by housing these optical system components and drive units such as a DC motor, a stepping motor corresponding to the respective optical system components in lens barrel 3. Each of various lenses constituting the optical system includes a plurality of lenses or a plurality of lens groups.

Camera body 1 is configured by housing a controller (not shown) and the like for controlling an operation of the entire camera, including an imaging unit (not shown) having the imaging element, in outer case 4. A top of outer case 4 of camera body 1 is provided with an operation unit, such as release button 5 and operating lever 6, and electronic view finder 7 etc.; a back side of camera body 1 is provided with display unit 8 such as a liquid crystal panel.

As shown in FIG. 2, a bottom of camera body 1 is provided with tripod socket 9 for mounting a tripod.

Figure 3:
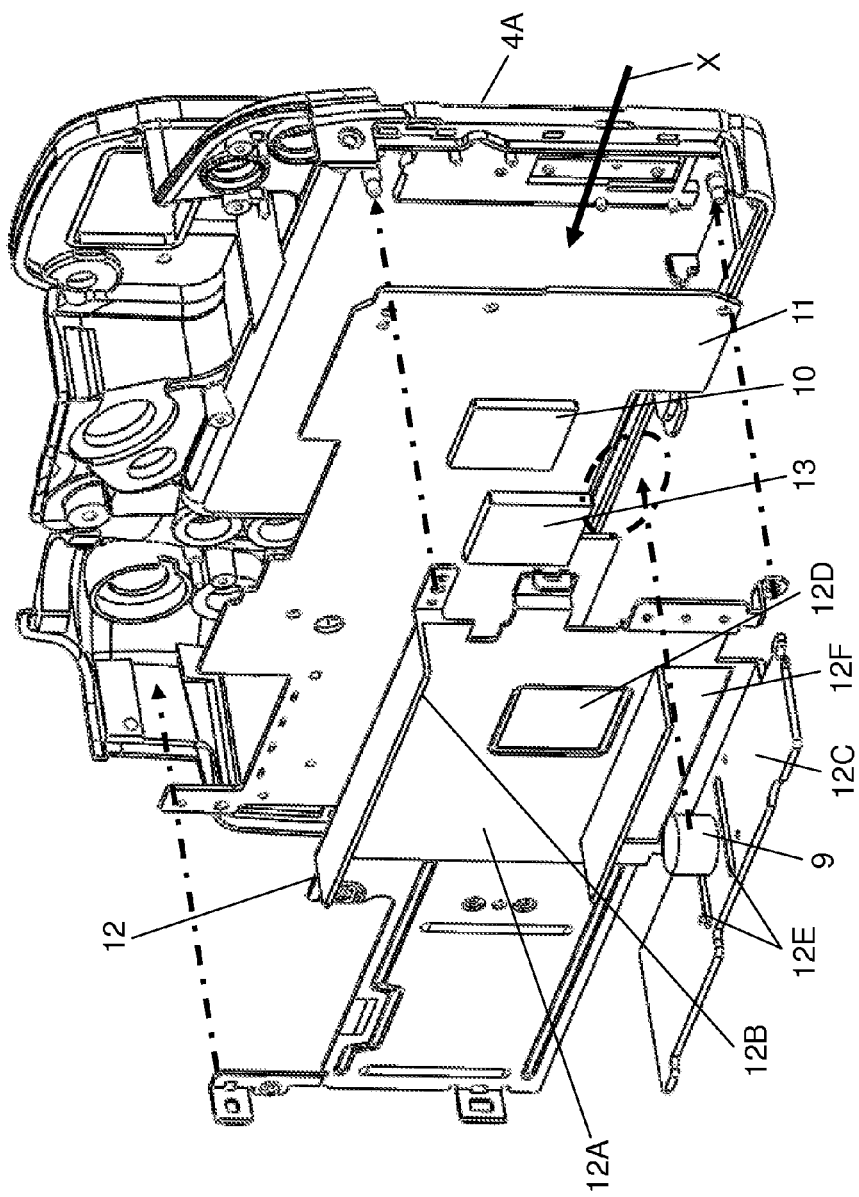
FIG. 3 is a perspective view showing an internal structure of a camera body of the digital camera with an interchangeable lens according to the embodiment of the present disclosure.

FIG. 3 is a perspective view showing an internal structure of a camera body of the digital camera with an interchangeable lens according to the embodiment of the present disclosure. In FIG. 3, the imaging unit and a front side of outer case 4 on which lens unit 2 is mounted are omitted.

As shown in FIG. 3, case 4A on the back side in outer case 4 of camera body 1 is provided with circuit board 11 having semiconductor device 10 mounted thereon that processes a signal from the imaging unit and makes up the controller for controlling the entire camera. In outer case 4, metal plate 12 made of metal with good thermal conductivity such as aluminum or stainless steel is disposed between the imaging unit and circuit board 11. Metal plate 12 is fixed to case 4A on the back side together with circuit board 11, as indicated by alternate long and short dash lines in FIG. 3.

Metal plate 12 includes first portion 12A that is flat and opposite to circuit board 11 and second portions 12B and 12C that are integrally formed at least at an upper portion and a lower portion of first portion 12A. First portion 12A has raised portion 12D that brings into mechanical contact with semiconductor device 10 through contact member 13 made of a member with good thermal conductivity. Second portions 12B and 12C are formed by bending so as to be parallel to an optical axis direction of the imaging unit. Note that although second portions 12B and 12C are integrally formed at an upper portion and a lower portion of first portion 12A, second portions 12B and 12C may be formed at other portions if they could be formed by bending so as to be parallel to the optical axis direction of the imaging unit.

Second portion 12C at the lower portion of metal plate 12 is provided with tripod socket 9 supported by second portion 12C. Tripod socket 9 is disposed to be fixed to the lower portion of outer case 4 as shown in FIG. 2. Second portion 12C of metal plate 12, which supports tripod socket 9, also has two ribs 12E that are formed on both sides of tripod socket 9 so as to be in the same direction as the optical axis. Each of two ribs 12E is integrally formed by extruding second portion 12C of metal plate 12.

First portion 12A of metal plate 12 is also provided with slit 12F between raised portion 12D that brings into mechanical contact with semiconductor device 10 and second portion 12C that supports tripod socket 9. Slit 12F is formed by cutting part of first portion 12A and raising the part of first portion 12A in a direction substantially parallel to second portions 12B and 12C.

While tripod socket 9 is fixed to second portion 12C of metal plate 12 in the example shown in FIG. 3, a configuration may be employed in which a metal plate supporting tripod socket 9 is provided independently of metal plate 12 and the metal plate supporting tripod socket 9 is mechanically connected to metal plate 12. In this case, two ribs 12E need to be formed on the metal plate supporting tripod socket 9 so as to be in the same direction as the optical axis.

The imaging device of the present disclosure includes: circuit board 11 that is disposed on the back side in outer case 4 and has semiconductor device 10 mounted thereon for processing a signal from the imaging unit; and metal plate 12 that is disposed between the imaging unit and circuit board 11 in outer case 4. Metal plate 12 has first portion 12A opposite to circuit board 11 and brings into mechanical contact with semiconductor device 10 through contact member 13, and at least two second portions 12B and 12C formed integrally with first portion 12A and formed by bending so as to be parallel to the optical axis direction. This allows metal plate 12 to have higher bending stiffness to displacement in the optical axis direction as compared to a case of a flat plate. Furthermore, metal plate 12 is in indirect mechanical contact with semiconductor device 10 and circuit board 11 through contact member 13, which allows semiconductor device 10 and circuit board 11 to be less susceptible to a deforming force caused by shock applied when the imaging device has been dropped, for example.

Figure 4:
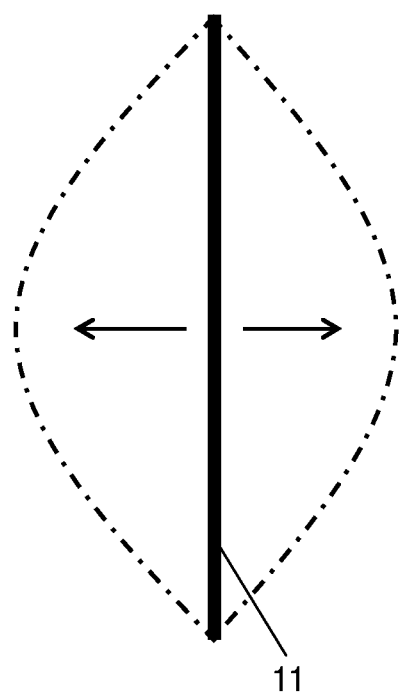
FIG. 4 is an explanatory diagram showing the concept of deformation to which a circuit board is subjected when an imaging device has been dropped.

FIG. 4 is an explanatory diagram showing the concept of deformation to which the circuit board is subjected when the imaging device has been dropped. FIG. 4 shows the deformation behavior of circuit board 11 when viewed from a direction of an arrow X in FIG. 3. For example, shock applied when the imaging device has been dropped exerts a deforming force on circuit board 11 as indicated by alternate long and short dash lines in FIG. 4, whereby circuit board 11 and semiconductor device 10 may be damaged. According to the present disclosure, the bending stiffness of metal plate 12 is increased and semiconductor device 10 and circuit board 11 are in indirect mechanical contact with metal plate 12. Thus, the deformation of circuit board 11 can be inhibited.

Metal plate 12 is structured such that second portion 12C supports tripod socket 9 or second portion 12C is mechanically connected to another metal plate supporting tripod socket 9 and such that ribs are provided that are formed on both sides of tripod socket 9 so as to be in the same direction as the optical axis. Thus, bending stiffness of a portion supporting tripod socket 9 also can be increased and vertical deformation with respect to the optical axis can be inhibited.

Additionally, first portion 12A of metal plate 12 is provided with slit 12F between raised portion 12D that brings into mechanical contact with semiconductor device 10 and second portion 12C that supports tripod socket 9. Slit 12F is formed by cutting part of first portion 12A and raising the part of first portion 12A in the direction substantially parallel to second portions 12B and 12C. Thus, heat transferred from semiconductor device 10 is less likely to be conducted to tripod socket 9 side as compared to the case of no slit 12F, thereby preventing tripod socket 9 from getting hot. Moreover, slit 12F is formed by raising part of metal plate 12 in the direction substantially parallel to second portions 12B and 12C, and this allows metal plate 12 to have higher bending stiffness to displacement in the optical axis direction.

As above, the embodiments are described as examples of the present disclosure. To this end, the accompanying drawings and detailed description are provided.

Accordingly, the components described in the accompanying drawings and detailed description may include not only those essential for problem solving but also those not essential for problem solving in order to illustrate the above disclosure. Therefore it should be understood that the accompanying drawings and detailed description of non-essential components does not immediately mean that those non-essential components are essential.

The embodiments described above are to illustrate the present disclosure, and various modifications, substitutions, additions, and omissions can be made within the scope of the appended claims or the equivalents thereof.

What is claimed is:

1. An imaging device comprising:
    an imaging unit that is housed in an outer case and captures an image of an object;
    a circuit board that is disposed on a back side in the outer case and includes a semiconductor device mounted thereon for processing a signal from the imaging unit; and
    a metal plate that is disposed between the imaging unit and the circuit board in the outer case and is fixed to the outer case, wherein
    the metal plate has a first portion opposite to the circuit board and brought into mechanical contact with the semiconductor device through a contact member, and at least two second portions formed integrally with the first portion and bent in an optical axis direction of the imaging unit.

2. The imaging device according to claim 1, wherein
    the metal plate is configured to be mechanically connected to a metal plate supporting a tripod socket.

3. The imaging device according to claim 2, wherein
    the metal plate supporting the tripod socket has ribs that are formed on both sides of the tripod socket so as to be in an identical direction with the optical axis.

4. An imaging device comprising:
    an imaging unit that is disposed on a front side closer to an object in an outer case and includes an optical system and an imaging element for capturing an image of the object;
    a circuit board that is disposed on a back side in the outer case and includes a semiconductor device mounted thereon for processing a signal from the imaging element; and
    a metal plate that is disposed between the imaging unit and the circuit board in the outer case and is fixed to the outer case, wherein
    the metal plate has a first portion opposite to the circuit board and brought into mechanical contact with the semiconductor device through a contact member, and at least two second portions formed integrally with the first portion and bent in an optical axis direction of the imaging unit, and one of the second portions provided at a lower portion of the metal plate supports a tripod socket.

5. The imaging device according to claim 4, wherein the one of the second portions, which supports the tripod socket, of the metal plate has ribs that are formed on both sides of the tripod socket so as to be in an identical direction with the optical axis.

6. The imaging device according to claim 5, wherein the first portion of the metal plate has a slit between a portion that makes mechanical contact with the semiconductor device and the one of the second portions, which supports the tripod socket.

* * * * *